(12) United States Patent
Waldman et al.

(10) Patent No.: US 8,954,275 B2
(45) Date of Patent: Feb. 10, 2015

(54) SCHEMATIC MAPS

(71) Applicant: Apple Inc., Cupertino, CA (US)

(72) Inventors: Jaron Waldman, Palo Alto, CA (US); Moran Ben-David, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/889,194

(22) Filed: May 7, 2013

(65) Prior Publication Data

US 2013/0253829 A1 Sep. 26, 2013

Related U.S. Application Data

(62) Division of application No. 12/701,437, filed on Feb. 5, 2010, now Pat. No. 8,463,543.

(51) Int. Cl.
*G08G 1/123* (2006.01)
*G01C 21/36* (2006.01)

(52) U.S. Cl.
CPC .......... *G01C 21/3644* (2013.01); *G01C 21/367* (2013.01)
USPC ........................................................ 701/533

(58) Field of Classification Search
USPC ......... 701/400, 409, 410, 426, 430, 432, 438, 701/455, 533
See application file for complete search history.

(56) References Cited

U.S. PATENT DOCUMENTS

| | | | |
|---|---|---|---|
| 6,993,350 B2 | 1/2006 | Katoh | |
| 7,450,003 B2 | 11/2008 | Weber et al. | |
| 7,561,962 B2 | 7/2009 | Sumizawa et al. | |
| 2002/0128772 A1* | 9/2002 | Polidi et al. | 701/208 |
| 2004/0172193 A1* | 9/2004 | Monde et al. | 701/209 |
| 2006/0085122 A1 | 4/2006 | Sumizawa et al. | |
| 2007/0112507 A1* | 5/2007 | Bargeron et al. | 701/208 |
| 2007/0225902 A1 | 9/2007 | Gretton et al. | |
| 2007/0276597 A1 | 11/2007 | Kato et al. | |

FOREIGN PATENT DOCUMENTS

| | | |
|---|---|---|
| DE | 4219326 | 12/1992 |
| DE | 102007059301 | 4/2009 |
| EP | 1734339 | 12/2006 |
| EP | 1847805 | 10/2007 |
| WO | 2004/112413 | 12/2004 |
| WO | 2009/14871 | 12/2009 |

OTHER PUBLICATIONS

International Search Report and Written Opinion mailed on May 30, 2011 for PCT/US2011/023560 (Pub No. WO 2011097353).

* cited by examiner

*Primary Examiner* — Kim T Nguyen
(74) *Attorney, Agent, or Firm* — Kilpatrick Townsend & Stockton LLP

(57) ABSTRACT

Systems and methods for preparing and presenting schematic maps, which are maps that present information in a format that presents only information that is most relevant to a given situation in order to provide a simple and clear representation sufficient to aid a user in guidance or orientation. The schematic maps as described herein can be formatted based on the attributes of a display on which they are presented so that the map layout and presentation can be optimized for the particular display. The schematic maps can be "distorted" to better illustrate important maps areas in greater detail and using a relatively larger display area while deemphasizing less important map areas by illustrating them in less detail and using a relatively smaller display area, and thus the schematic maps can be devoid of adherence to a particular scale.

24 Claims, 8 Drawing Sheets

SCHEMATIC MAPS

CROSS-REFERENCE

This application is a divisional application of, and claims priority to, U.S. patent application Ser. No. 12/701,437 (filed Feb. 5, 2010), the contents of which are hereby incorporated by reference in its entirety.

FIELD

The following relates to electronic maps and more specifically to electronic, schematic maps.

BACKGROUND

In recent years, electronic mapping applications and providers have added more and more information into their maps. Recent developments include high resolution satellite and aerial imagery, 3-D buildings, and street views. These recent advancements in the electronic mapping field, combined with the vast databases of locations, destinations, service providers, etcetera have led to increasingly complicated and crowded maps that are full of information that might or might not be useful to a user.

At the same time, handheld computing devices have grown increasingly powerful and more important in the everyday lives of many people. An increasing portion of the population is becoming more likely to look for information such as maps and directions in the palm of their hand using these various mobile platforms. Unfortunately, despite great improvements in the handheld devices, their usefulness is often constrained by their relatively small displays. This is particularly true with respect to electronic maps since they include so much information it is difficult to visually extract the information that is truly most useful from the details. Accordingly, one problem to be solved is to provide electronic maps that are configured based on display information. Another problem to be solved is to display only the most useful information to a user,

SUMMARY

The following relates to preparing and presenting schematic maps, which are maps that present information in a format that presents only information that is most relevant to a given situation in order to provide a simple and clear representation sufficient to aid a user in guidance or orientation. The schematic maps as described herein can be formatted based on the attributes of a display on which they are presented so that the map layout and presentation can be optimized for the particular display. The schematic maps can be "distorted" to better illustrate important maps areas in greater detail and using a relatively larger display area while deemphasizing less important map areas by illustrating them in less detail and using a relatively smaller display area, and thus the schematic maps can be devoid of adherence to a particular scale.

The schematic maps can be useful for providing directions or maps of surrounding areas and maps displaying places of interest and locations of people in the surrounding area. The maps can be prepared and presented by executing a method on a device having at least a processor and a display by analyzing map vector data, which includes information describing map features including a start point, one or more potential end points, and one or more possible routes for directions to an end point.

A region of geographic focus can be identified. Such a region can be a region to be displayed as a schematic map, or it can be a region that encompasses all search results near a given start point. The region of geographic focus can also be determined by considering display attributes, since displays with some aspect ratios will display regions having one shape better than others.

All the map features within the region of geographic focus can be ranked by a processor in a usefulness index according to a value system that provides higher values or greater weight to map features that are likely to be the most important features to a user viewing the schematic map. The usefulness index, can be a list or a table or other data structure that organizes the map features according to how useful or important the feature is to the likely purpose of the map. For example, in a schematic map displaying directions, the most important features are those making up the route, i.e., the various route segments. Next would be landmarks that are useful in locating a turn or progress along the route. Other landmarks that a user will see along the route that are useful in general orientation, or that are prominent landmarks, might be ranked next. Small stores or parks that are far off the route might be the least important and ranked lowest in the usefulness index. Map features given a rank greater than a threshold for display can be displayed on the schematic map.

As mentioned above, the schematic map can be optimized for the display of the particular device on which it is shown. An orientation in which to display the selected map features on the display can be selected based on display attributes, and each route segment selected for display can be drawn as an approximately straight line. The orientation of the lines can be an approximation of an overall direction of travel along the way, and the schematic map can be displayed by presenting the selected map features on the display in an optimized orientation.

Before and/or after the schematic map has been presented on the display, the schematic maps can be "distorted" to better illustrate important maps areas in greater detail and using a relatively larger display area while deemphasizing less important map areas by illustrating them in less detail and using, a relatively smaller display area, and thus the schematic maps can be devoid of adherence to a particular scale.

DESCRIPTION

Figure 1:
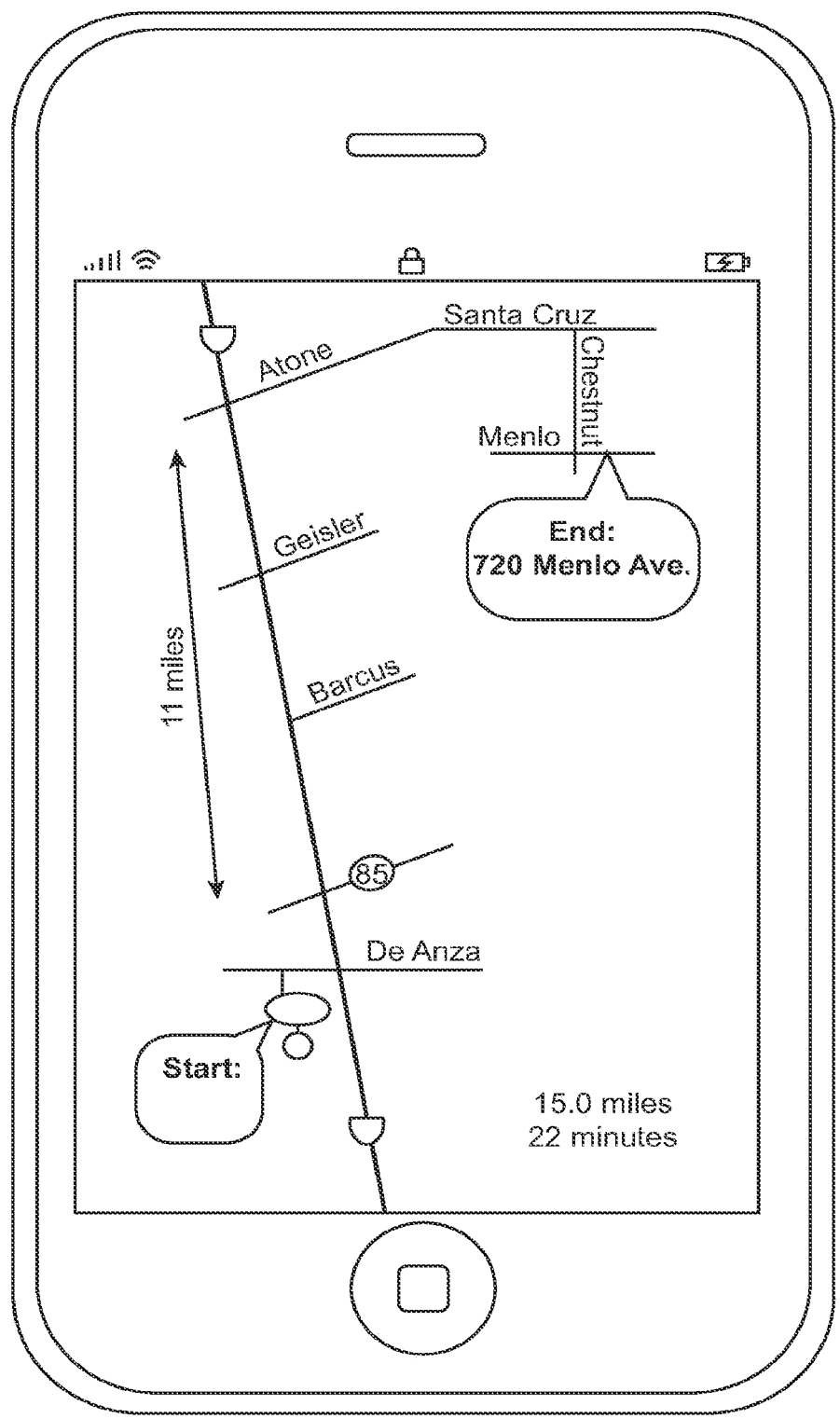
FIG. 1 illustrates a schematic map.

The technology described herein presents maps, driving directions, and other map-related features in a schematic fashion. A schematic map on a computing device is similar to a subway map one would see on a subway train. While the subway track itself might wind and turn, a typical subway map represents the subway route as a mostly straight line. Further, the subway map often does not have any particular scale and frequently shows every destination approximately evenly dispersed along the route. Thus, a schematic map as discussed below is one that does not adhere to geographic "reality," but rather represents map features in a schematic fashion by illustrating directions as a route made of one or more roads, trails, or ways that can be represented as substantially straight lines instead of by their actual shapes (which would be represented in a non-schematic map by adhering, to geographic reality). The schematic map can also be devoid of a particular scale. Thus, in some parts of the map, such as an area of the map representing a destination, such area can be "distorted" somewhat to clearly illustrate important details, while map areas that represent portions of a route where there are no turns or other significant features can be very condensed, in short, the map can be a schematic of the real world that can provide a simple and clear representation that is sufficient to aid a user in guidance or orientation without displaying unnecessary map features or detail that could otherwise clutter a small display space as illustrated in FIG. 1.

In a conventional electronic map, great detail is shown but it is hard to clearly read. Even the streets leading to the destination are not easy to see. In comparison, the schematic map displays relatively little detail, but the features that are displayed are clearly shown. For example, the streets in the immediate vicinity of the destination have been emphasized and are easy to see.

Figure 2:
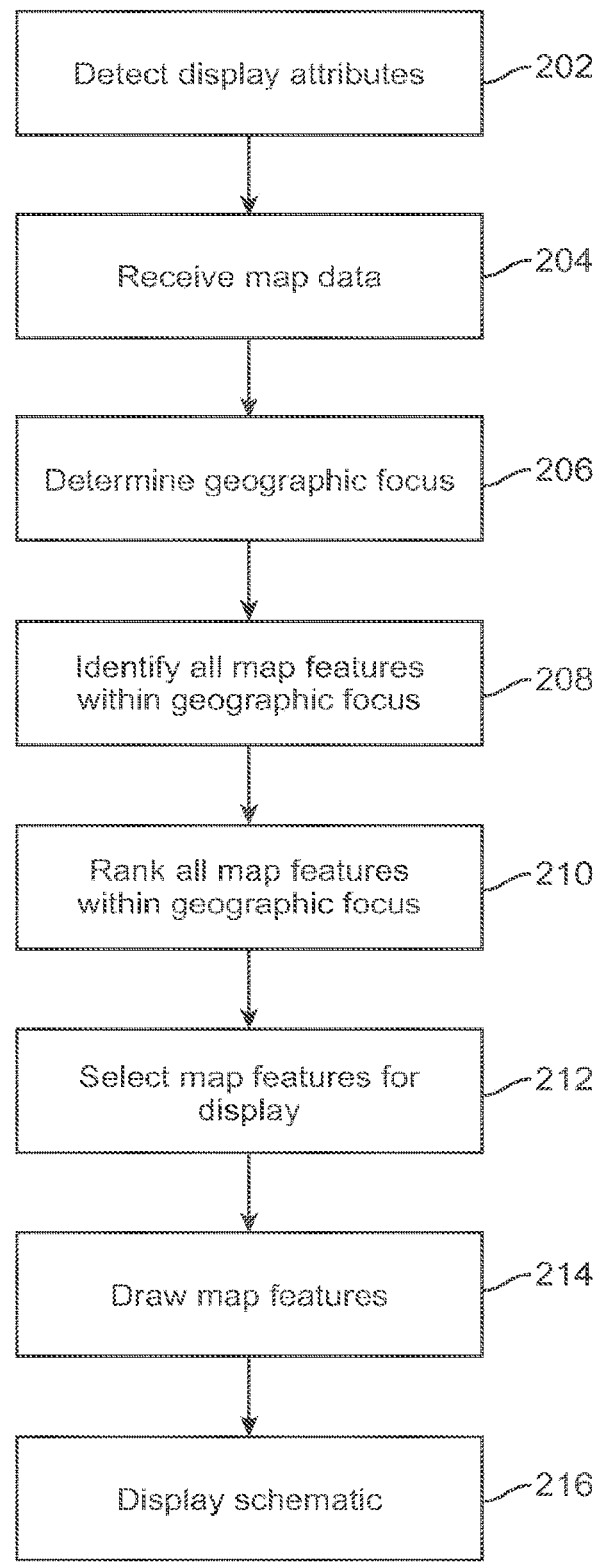
FIG. 2 is a flow chart illustrating an exemplary method of preparing a schematic map.

FIG. 2 illustrates an exemplary embodiment of a method for generating and displaying schematic maps. At 202, the attributes of a display device are detected so that the schematic map can be formatted most appropriately for the display device. Larger displays can support a greater number of features while smaller displays require a more selective display of features. Similarly, the orientation of the display is important. Some displays have a landscape orientation and can support a greater number of features in a horizontal direction. Conversely, some screens have a portrait orientation and can support display of a greater number of features in a vertical direction (e.g., as on some handheld devices such as art IPOD TOUCH or IPHONE, both by Apple, Inc. of Cupertino, Calif.). Further, some devices can be rotated from a landscape orientation to a portrait orientation and the display will change accordingly. Other exemplary display attributes include screen size, aspect ratio, resolution, type, and orientation. Once detected, display attributes can be stored in memory for subsequent use.

At 204, map data that will be used to generate the schematic map is received in some embodiments, map data is received from a server. In such embodiments, the device generating the schematic maps is not required to keep the map data stored on the device. This is especially useful for some handheld devices that have a limited storage capacity.

In one example, the map data is received after a search for nearby restaurants or other places/items of interest. In this example, a search is input into the device and, based on either the present location of the device or another set point, a server can return map data to the device. In these embodiments, the map data includes data describing results of a search, and data describing all other map features surrounding the search results and present location/set point. In some embodiments, each search result can be considered a potential destination, and directions from the present location/set point to each potential destination can also be included in the map data.

In another example, the map data is received after a search for directions from a starting point to one or more destinations. In such embodiments, the map data can include data describing a route from the start point to the destination or destinations and data describing all map features surrounding the route(s).

The data describing map features can be called vector data, which is a way of capturing the geometry/geography of places. For example, vector data can be used to capture the shape of an interstate, for example I-280 in California. While a raster map of California contains the shape of I-280 as a set of pixels, vector data captures the coordinates (e.g., latitude and longitude and elevation) used to draw the map image along with other attributes describing the object. Most commonly, vector data describes map objects as points, lines or polylines, and polygons. Vector data allows programs to manipulate and query the shape data rather than merely displaying the map feature.

One example of a vector data file format is the SHAPEFILE, by ESRI of Redlands, Calif. SHAPEFILE is a popular geospatial vector data format for geographic information systems software. A SHAPEFILE is a digital vector storage format for storing geometric location and associated attribute information. The SHAPEFILE format can be a series of files linked together to describe a location and a shape of a map feature. SHAPEFILE is just one example of map vector data for use with the present technology, and any other data format or geographical information system that describes map features as geometrical shapes could also be used.

After the map data is received by the device, the area of geographic focus can be determined (206). An area of geographic focus is a geographic area of interest. It can be determined based on the area surrounding a present location, or it can be based on a set point and potential destinations. For example, if a search was conducted for directions between a start point and a destination, the geographic focus area would be based on the area surrounding and encompassing the route. Similarly, for a search for nearby places of interest, the area of geographic focus would be include search results and the surrounding areas.

The display attributes can also be considered in determining the geographic focus. While the geographic focus should encompass enough area to display the search results, the area of geographic focus can be limited based on the display attributes.

Within the area of geographic focus, all map features are identified (208). The map data contains information about every map feature, and these features are identified and ranked (210) according to their relevance to the schematic map that will be displayed. One way to identify and rank each feature within the area of geographic focus is to identify every map feature described by the map data and list it in a usefulness index stored in a memory. The usefulness index can be a table or any other data structure for recording and storing each map feature's relative importance or usefulness in guiding a user to a destination or orienting a user based on the schematic map. Each feature can be given a ranking or a score based on its importance to the schematic map, and this ranking can also be stored in the table.

The importance of a map feature is dependant on the intended application of the map. For example, if the map is to display driving directions, the route can be the most important map feature and landmarks along the route can be ranked according to prominence and visibility along the route. Accordingly, in a driving-direction map application, the more important a map feature is to aiding a user in navigating along the route, the higher the rank. If the map application is a map of nearby points of interest, streets, trails, buildings, and other map features are all landmarks that can orient the user to the potential destination; they too can be ranked according to importance in orienting or guiding the user to the potential destination.

After the map features are ranked (210), map features can be selected for display (212). Map features can be selected by having a rank greater than a threshold ranking. For example, if the ranking scale was a scale from 1-10, with 10 being the most important map features, only features with rankings of 9 or 10 might initially be selected for display. The threshold ranking can also be relative to the overall density of the vector data, which varies according to the map's geographic area of focus. For example, in a densely populated urban area there are relatively more map features available and thresholds must be relatively high to prevent map clutter when compared to rural areas with fewer map features.

Figure 3:
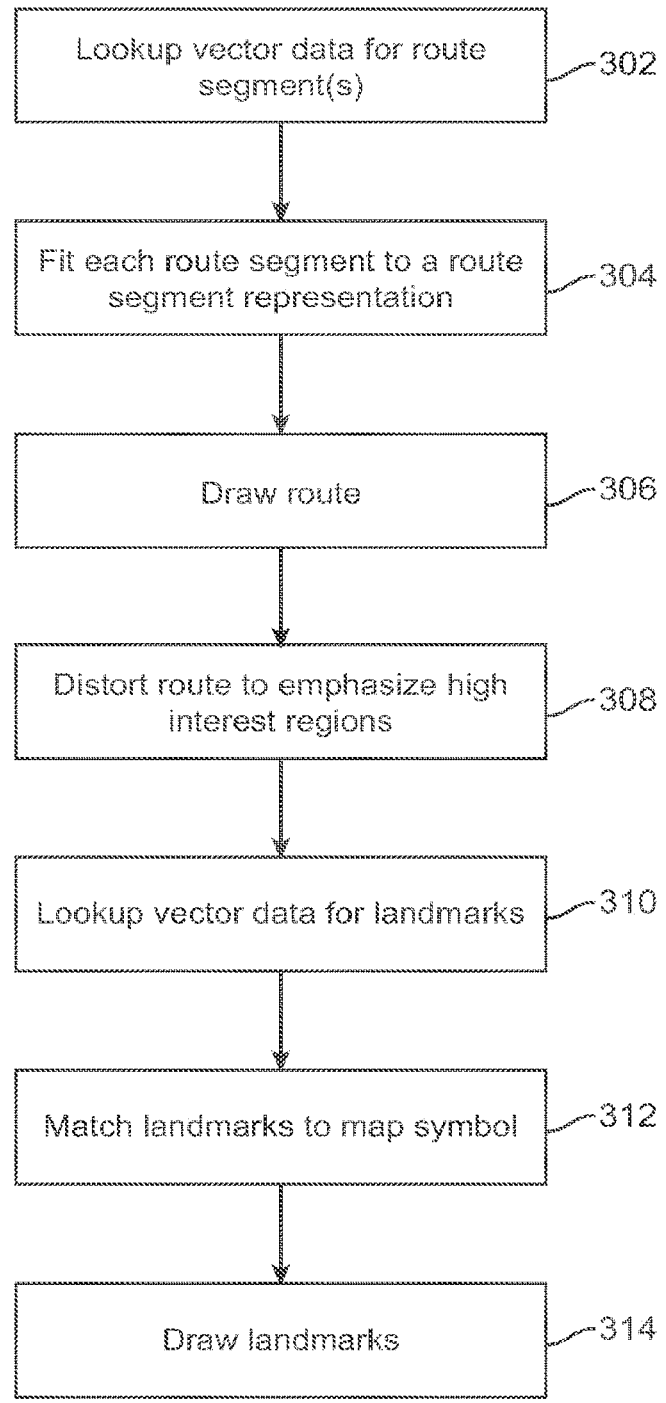
FIG. 3 is a flow chart illustrating an exemplary method of drawing a schematic map.

The map features selected for display are used to draw a map (214), e.g., using the method illustrated in FIG. 3. Using the example of driving directions, the route can be drawn first. The device can look up vector data for each route or route segment (302). Using the vector data, each route segment can be fitted to a route segment representation (304). As roads in the real world are often not in a straight line, the vector data representing the road will contain information describing the shape of the road. The device processor can interpret this data and ignore the less significant twists and turns of the route and determine an overall direction of travel. The processor can then draw the route segment as a straight line that approximates the overall direction of travel along, that route segment.

In some embodiments, only a limited number of route directions might be available. For example a route segment might be fitted to one of eight possible directions of travel, i.e., North, Northeast, East, Southeast, South, Southeast, West, and Northwest. It should be appreciated that the eight possible directions of travel presented above are not considered to be limiting. Any number of potential directions of travel are considered to be within the scope of the present technology.

The route is completed (306) using the fitted route segments, which intersect to illustrate turns in the route. In some embodiments, before the route is drawn, the display attributes can be used to determine the best orientation in which to draw the route. The best orientation can be chosen based on heading, aspect ratio and orientation of the screen, shape of area of geographic focus, or other factors. For example, the best orientation can be selected based on directional heading so as to keep the top of the screen pointing north. The best orientation can also be chosen to place the overall direction of travel along the long dimension of the display screen. The best orientation can also be chosen based on the shape of the area of geographic focus or the overall shape of the route. In such cases, the best orientation can be based on the best match of the shape of the area of geographic focus or the overall shape of the route to the shape of the display. In some embodiments, a combination of the factors can be used to determine the best orientation.

In some embodiments, the best or most desirable orientation might require, the top of the display point east or west, but this can be confusing to users that might be accustomed to having the top of a map point north. In such situations, a graphic symbol can be provided to orient the user as to which direction is north, In some embodiments, a message or graphic symbol could instruct a user to rotate the device so that the top of the screen will represent north.

On some devices, the resolution of the display might not allow for sufficient detail to for a user to make out the important details in the map or the map might be too large to display on the screen. On such devices, a scroll mechanism can be used to allow only a portion of the map to be displayed on the screen and allow a user to scroll or pan to other regions on the map.

The overall route can be "distorted" (308) from geographic reality in order to emphasize regions of high interest. Areas of high interest can include turns, areas surrounding a destination, areas surrounding a user's present location, areas surrounding search results, and other points of interest such as gas stations, parks, restaurants, etc. What constitutes an area of high interest can, in some embodiments, be based, in part, on user preferences.

Figure 4:
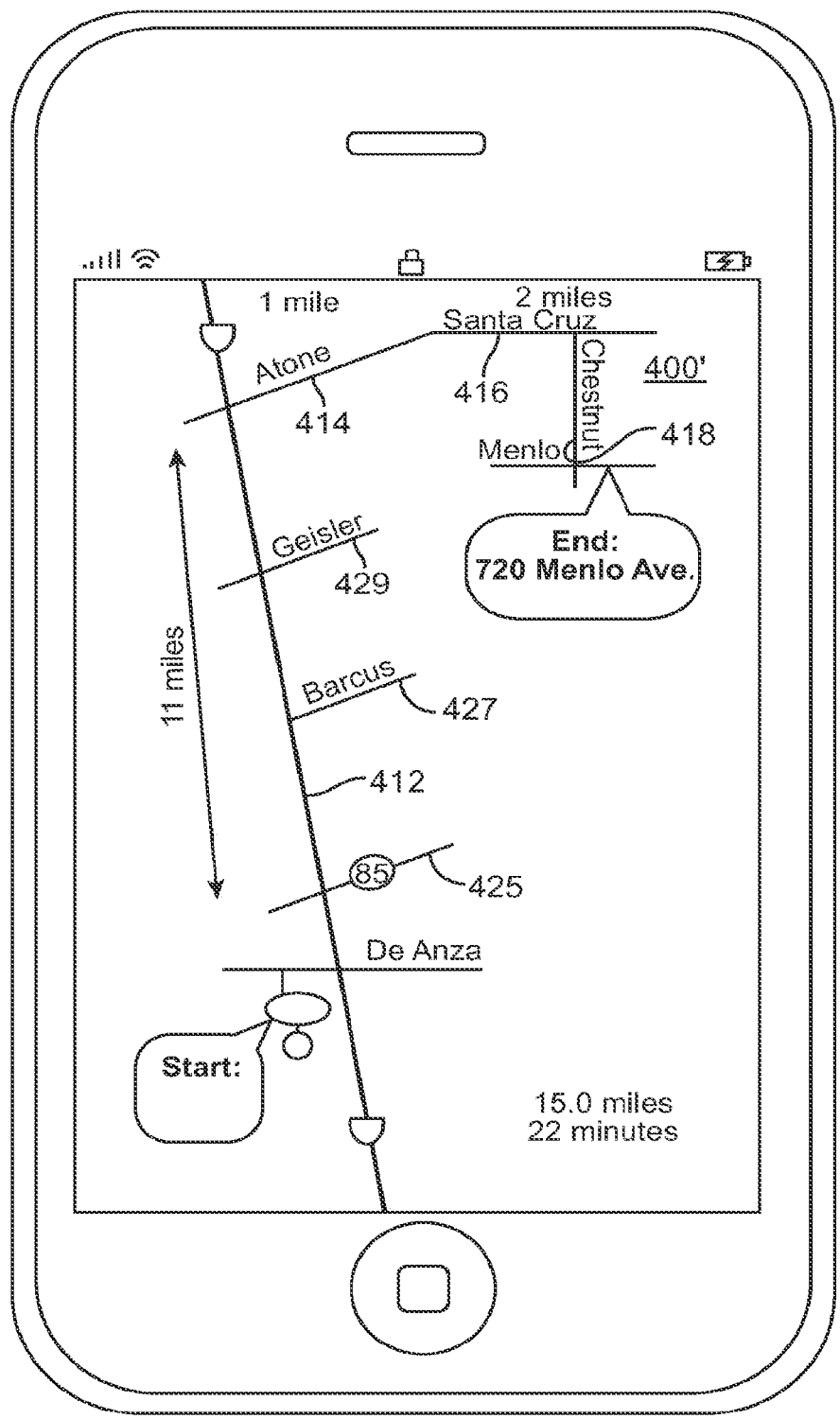
FIG. 4 illustrates a schematic map depicting driving directions and the distortion therein.

FIG. 4 illustrates an example of a distorted schematic map. As illustrated by the indicated adjacent to the route segments 412, 414, 416, 418, the schematic map has no uniform scale. For example, the "real world" distance of route segment 412 is approximately 11 miles, while the distances of route segments 414, 416, and 418 are approximately 1 mile, 2 miles, and 400 feet, respectively. However, despite the fact that route segment 412 is approximately 11 times longer than route segment 414, route segment 412 is only approximately twice as long. Thus, any scale that might be used in representing route segment 412 is riot necessarily consistent with any of the other route segments 414, 416, 418. Furthermore, a given route segment might not be represented by the same scale across its entire length. For example, landmarks 425, 427, 429 appear approximately evenly spaced, but they are not necessarily so in reality.

The distortion illustrated in FIG. 4 allows the destination to be emphasized as an area of high interest, and to a lesser extent, the starting point. For example, route segment 418 depicts only 400 feet, but it is so large on the display that it looks as if it were the same length as several miles on route segment 412. To a lesser degree, the area around the start point is also enlarged so that turns can be clearly illustrated.

As further illustrated in FIG. 4, landmarks are also helpful in navigating the route. Thus, at 310, the device can lookup vector data for landmarks. The landmarks can either be drawn using information in the vector data or by matching the landmarks to symbols used by the system at 312. For example, in the case of a lake, the vector data would be sufficient to provide a shape of the lake and identify the object as such. In some embodiments, the lake could be drawn based on vector data, in other embodiments, a symbol for a lake could be used to represent the lake. Likewise, other symbols can be used. Trademarks might be used to represent certain commonly known and easily recognized stores, such as some convenience stores, gas stations, or banks, etc. In this way, a user will know which store he is to king for as a landmark. Roads can also be landmarks and represented as lines as they are depicted in FIG. 4 as 425, 427, and 429. Generic symbols can also be used.

Landmarks can be selected for display based not only on their relevance, as explained above, but also based on the amount of room available to display landmarks. While some landmarks might always be displayed on a particular map due to a high relevancy ranking—for example very large bodies of water potentially will always be displayed—some landmarks will only be displayed if there is room and they are relevant. For example, in a high-interest region that has been distorted to increase its visibility, there is more room to display additional landmarks. In such a situation, a corner store might be displayed even though its relevancy ranking is less than some other more prominent landmarks. However, the corner store is still relevant in identifying a turn in the route. Landmarks and detail that are not useful to a user generally will not be displayed.

The landmarks that are selected for display can also be relative to the overall density of the vector data representing the map features, which varies according to the map's geographic area of focus. For example, in a densely populated urban area there are relatively more map features available and thresholds must be relatively high to prevent map clutter when compared to rural areas with fewer map features.

Once a representation of the landmark is selected for display, it can be drawn coin the map 314. Each of the landmarks can be drawn in any desired location, provided that they are each shown in a proper position relative to other landmarks. For example, landmark 429 can be placed anywhere between landmark 427 and route segment 414, but cannot be placed outside of either map feature because that would misled a user. Landmark 429 exists between landmark 427 and route segment 414 in "reality" and its relative positional orientation is maintained in the schematic map. With the exception of a varying scale, and modified shapes, the location of all map objects must adhere to geographic positional reality at least with respect to the relative placement of other features on the map. As an example, assume two roads run in parallel with Road A being to the East of Road B and that the two roads are separated by 5 miles, In a schematic map roads A and B can appear any distance apart, but Road B cannot be placed West of Road A.

As further shown in FIG. 2, the schematic map is displayed at 216. The schematic map can first be drawn in a device memory and displayed on the display once completed. However, in some embodiments, the schematic map can be drawn in real time on the display.

The distortion in a schematic map can, in sonic embodiments, be dynamic. In other words, as the user with the device travels along a route, the portion of the route that has already been traveled loses its importance to the user, at least for the purpose of navigating a user to a destination. However, the present location increases in importance. Therefore, the schematic map can be dynamically altered to remove portions of the map representing route segments that have already been traveled and can enlarge areas surrounding the present location of the device. The map can also be distorted based on user inputs, such as zooming in on a portion of the map, searching for points of interest along the route, and other inputs.

Figure 5:
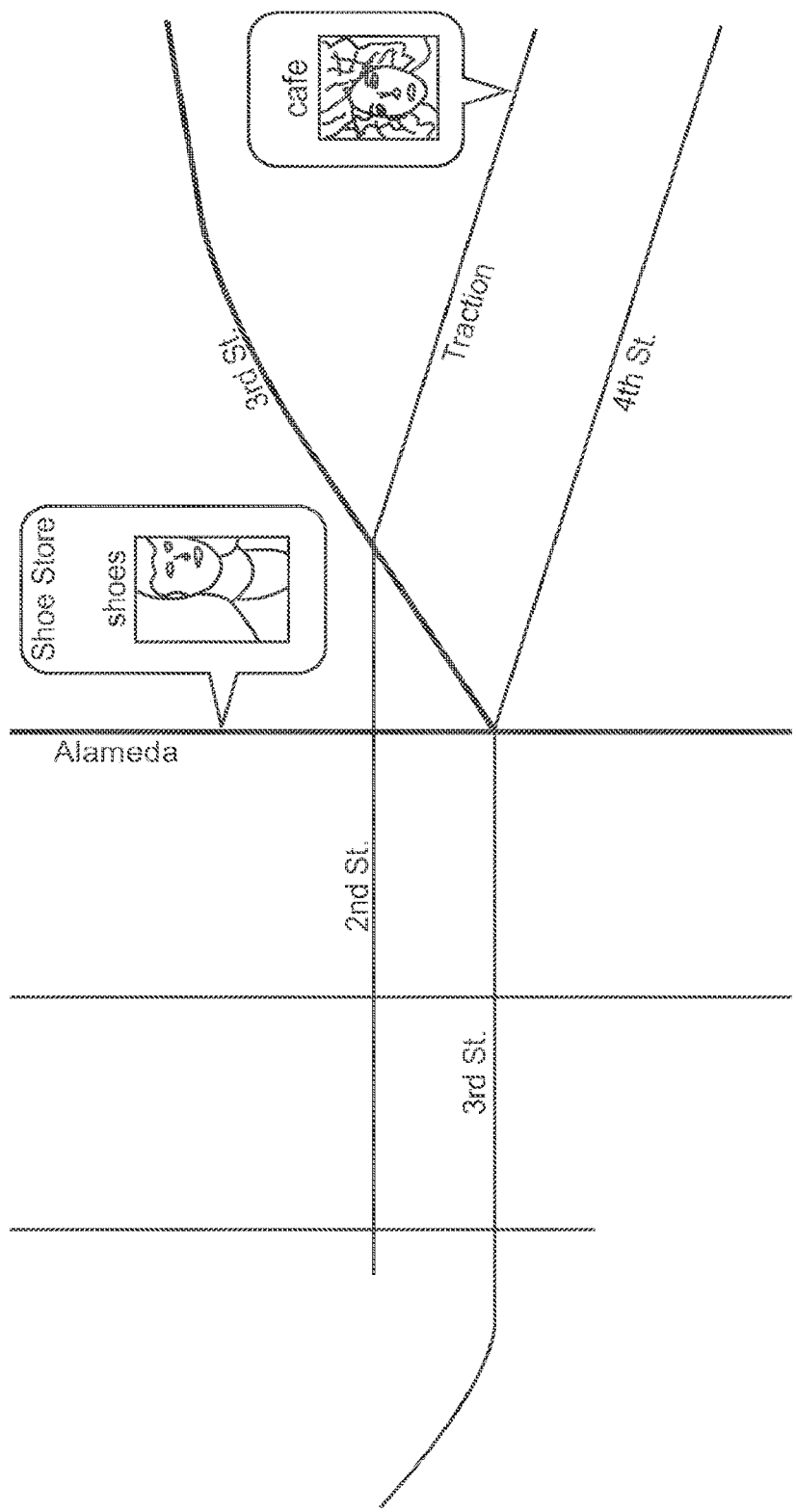
FIG. 5 illustrates a schematic map depicting the location of friends in the vicinity of the device.
Figure 6:
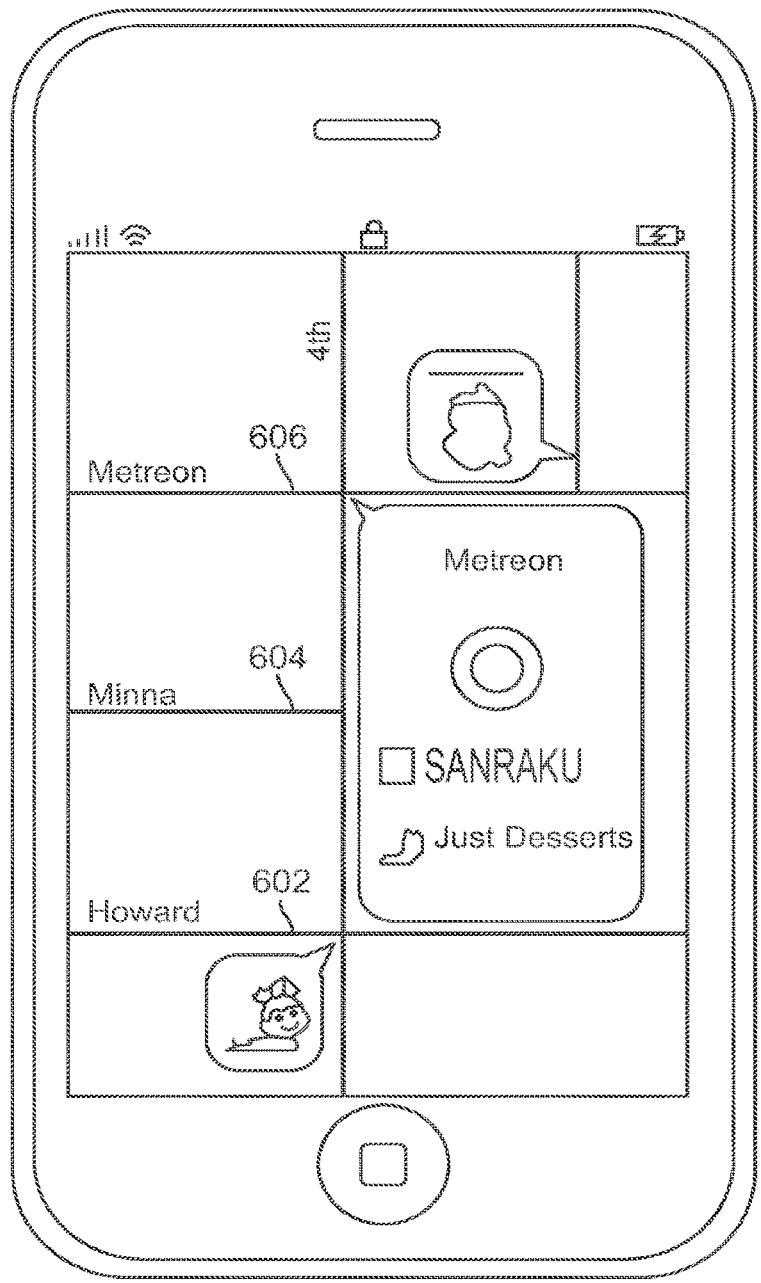
FIG. 6 illustrates a schematic map depicting the location of places of interest in the vicinity of the device.

Schematic maps are useful for more than just providing directions. As illustrated in FIGS. 5 and 6, schematic maps can also be useful in finding nearby friends or places. In both figures only import landmarks and features of interest are displayed. Outlines of buildings, which are common in some state-of-the-art mapping programs, are omitted because they are of little use to a user at street level attempting to find the locations of friends in an unfamiliar area. Even much of the street detail has been omitted. Only streets and friends or points of interest are displayed, i.e., the key information to guide a user to those locations.

As in the case of the navigation-oriented embodiments, the landmarks are not necessarily drawn to a particular scale, and not all features necessarily are represented. For example, in FIG. 6, landmark 604 is a small alley in real life but it is drawn with the same thickness as landmarks 602 and 606, which are relatively major streets. In this instance, landmark 604 is just as important in navigating to the snacks nearby as 602 and 606 and thus can be drawn with the same emphasis although, in some instances landmark 604 might be drawn in a thinner line to signify to the user that it is a smaller road as compared to landmarks 602 and 606.

It should be appreciated that variations in the methods described herein are considered to be within the scope of this technology. For example, while one exemplary order of execution has been described above, the method can be executed in a different order. For example, the area of geographic focus can be determined before the map data is received. In such embodiments, the area of geographic focus can be determined by a server sending the map vector data or by the device requesting the map vector data in response to a query or search.

Additionally, parts of the method described herein can be executed on a server or a client device. In some embodiments, a client device can have all data "on board," that is, on the device. In some embodiments, the entire method except for the drawing steps can be completed by a server and only the completed map can be sent to a client device. In other embodiments, the client device and the server can work together to complete the steps of the methods described herein. For example, a server can contain all map data and send only needed data to the client so that the client can construct the schematic map. In some embodiments the server can complete just an initial schematic map, but then send vector data corresponding with the map so that the client device can manipulate the map itself. Other variations of client server responsibilities are also possible and are considered to be within the scope of this technology.

Figure 7:
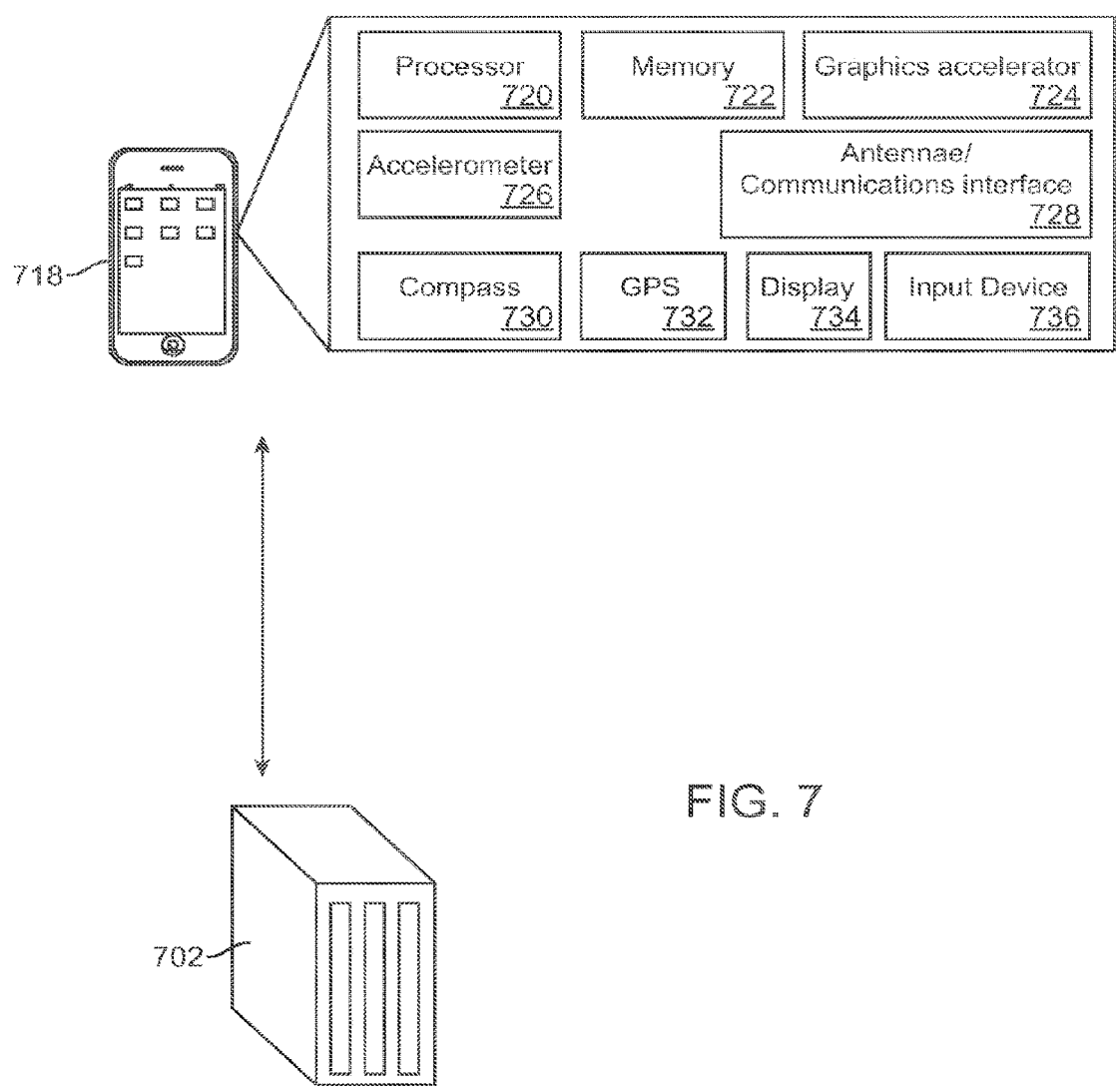
FIG. 7 illustrates schematically an exemplary system embodiment.

FIG. 7 illustrates an exemplary system embodiment 700. A server 702 is in electronic communication with a handheld electronic device 718 having functional components such as a processor 720, memory 722, graphics accelerator 724, accelerometer 726, communications interface 728, compass 730, GPS 732, display 734, and input device 736. Each device is not limited to the illustrated components. The components may be hardware, software or a combination of both.

In some embodiments, instructions are input to the handheld electronic device 718 through an input device 736 that instructs the processor 720 to execute functions in an electronic mapping application. One potential instruction can be to generate a schematic map, in that case the processor 720 instructs the communications interface 728 to communicate with the server 702 and request map data. The map data received by the communications interface 728 and either processed by the processor 720 immediately or stored in memory 722 for later use, or both. The processor 720 also receives information regarding the display's 734 attributes, and can calculate the orientation of the device, or e.g., using information from an accelerometer 726 and/or other external data such as compass headings from a compass 730, or UPS location from a UPS chip, and the processor then uses the information to determine an orientation in which to display the schematic map drawn from the map data.

The schematic map can be drawn by the processor 720, by a graphics accelerator 724, or by a combination of the two. In some embodiments, the processer can be the graphics accelerator. The map can be first drawn in memory 723 or, if available, memory directly associated with the graphics accelerator 724. The methods described herein can be implemented by the processor 720, the graphics accelerator 724, or a combination of the two to draw the map. Once the map is drawn in memory, it can be displayed on the display 734.

A map drawn for one reason can also be modified for other purposes. For example, a map drawn to illustrate places of interest can also be used to select a destination using an input device. If a destination is selected, the map can be modified to display directions or a route to the new destination, in some embodiments, the entire map can be redrawn, but in some embodiments, the items in the usefulness index can be re-ranked and the map modified based on the updated usefulness index.

Figure 8:
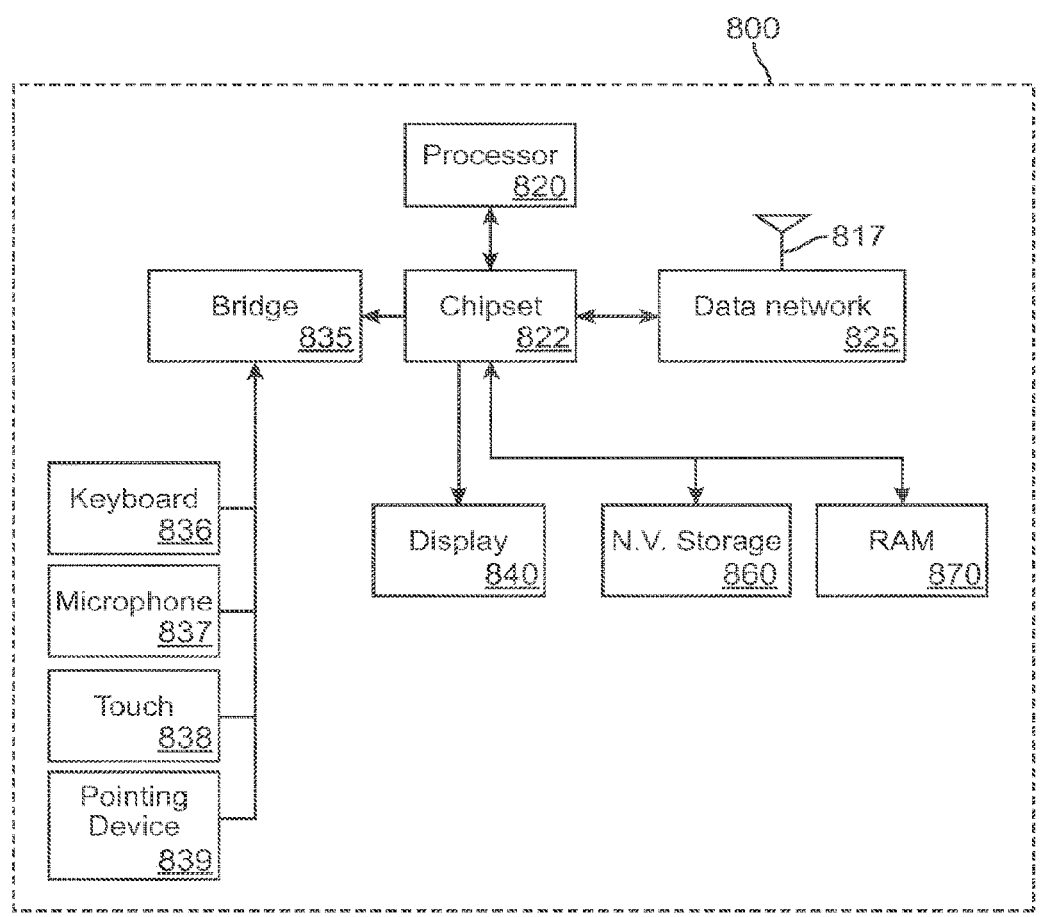
FIG. 8 illustrates schematically an exemplary system embodiment.

FIG. 8 illustrates a computer system 800 used to execute the described method and generate and display a Graphical User interface. Computer system 800 is an example of computer hardware, software, and firmware that can be used to implement disclosures above. System 800 includes a processor 820, which is representative of any number of physically and/or logically distinct resources capable of executing software, firmware, and hardware configured to perform identified computations. Processor 820 communicates with a chipset 822 that can control input to and output from processor 820. In this example, chipset 822 outputs information to display 840 and can read and write information to non-volatile storage 860, which can include magnetic media and solid state media, for example. Chipset 822 also can read data from and write data to RAM 870. A bridge 835 for interfacing with a variety of user interface components can be provided for interfacing with chipset 822. Such user interface components can include a keyboard 836, a microphone 837, touch-detection-and-processing circuitry 838, a pointing device such as a mouse 839, and so on. In general, inputs to system 800 can come from any of a variety of sources, machine-generated and/or human-generated sources.

Chipset 822 also can interface with one or more data network interfaces 825 that can have different physical interfaces 817. Such data network interfaces can include interfaces for wired and wireless local area networks, for broadband wireless networks, as well as personal area networks. Some applications of the methods for generating and displaying and using the GUI disclosed herein can include receiving data over physical interface 817 or be generated by the machine itself by processor 820 analyzing data stored in memory 860 or 870. Further, the machine can receive inputs from a user via devices keyboard 836, microphone 837, touch device 838, and pointing device 839 and execute appropriate functions, such as browsing functions by interpreting these inputs using processor 820.

While FIG. 8 illustrates an example of a common system architecture, it should also be appreciated that other system architectures are known and can be used with the present technology. For example, systems wherein most or all of the components described within FIG. 8 can be joined to a bus, or the peripherals could write to a common shared memory that is connected to a processor or a bus can be used. Other possible hardware architectures are possible and such are considered to be within the scope of the present technology.

Methods according to the above-described examples can be implemented using computer-executable instructions that are stored or otherwise available from computer-readable media. Such instructions comprise, for example, instructions and data which cause or otherwise configure a general-purpose computer, as special-purpose computer, or a special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information to be used, and/or information created during methods according to described examples include magnetic or optical disks, flash memory, USB devices provided with non-volatile memory, networked storage devices, and so on.

Devices implementing methods according to this disclosure can comprise hardware, firmware and/or software and can take any of a variety of form factors. Typical examples of such form factors include laptops, smart phones, small-form-factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in this disclosure.

Although a variety of examples and other information have been used to explain various aspects within the scope of the appended claims, no limitation of the claims should be implied based on particular features or arrangements in such examples, as one of ordinary skill would be able to use these examples to derive a wide variety of implementations. Furthermore, and although some subject matter may have been described in language specific to examples of structural features and/or method steps, it should be understood that the subject matter defined in the appended claims is not necessarily limited to those described features or acts. For example, functionality of the various components can be distributed differently or performed in components other than those identified herein. Therefore, the described features and steps are disclosed as examples of components of systems and methods that are deemed to be within the scope of the following claims.

The invention claimed is:

1. A handheld device comprising:
   a communications interface configured to receive map vector data describing map features including landmarks, route segments, and potential points of interest for an area of geographic focus;
   a processor configured to analyze the map vector data, the processor further configured to rank each map feature in a usefulness index according to each respective map feature's usefulness in directing a user to a destination, the processor further configured to select for display all map features having a usefulness ranking greater than a feature display threshold, wherein the feature display threshold is a number indicating a threshold usefulness ranking, wherein the processor adjusts the feature display threshold based on a density of the map features within the area of geographic focus;
   a graphics accelerator configured to draw a schematic map comprising the map features selected for display, the route segments thereof being drawn as substantially straight lines that intersect other route segments to comprise a route from a starting point to the destination, the graphics accelerator further configured to distort the schematic map to emphasize at least one of the selected map features;
   a display configured to display the schematic map; and
   a user interface configured to accept user inputs instructing the processor to generate or modify the schematic map.

2. The device of claim 1, wherein the user interface is a touch screen.

3. The device of claim 1, wherein the schematic map presents directions to the destination.

4. The device of claim 1, further comprising a memory for storing the map vector data.

5. The device of claim 4, wherein the processor is configured to access the memory to analyze the stored map vector data to update the schematic map.

6. The handheld device of claim 1, wherein having a usefulness ranking greater than a feature display threshold comprises having a rank score greater than a feature display threshold rank score.

7. The handheld device of claim 1, wherein the map features can be re-ranked.

8. The handheld device of claim 1, wherein the schematic map does not conform to a particular scale.

9. The handheld device of claim 1, wherein the potential points of interest include search results, businesses, and friends of a user.

10. The device of claim 1, wherein the feature display threshold is adjusted upward for a higher density of the map features within the area of geographic focus and wherein the feature display threshold is adjusted downward for lower density of the map features within the area of geographic focus.

11. The device of claim 1, wherein the processor is configured to determine the usefulness ranking for at least one of landmarks and potential points of interest.

12. A system comprising:
a processor configured to analyze map vector data, the map vector data comprising data describing map features including landmarks, route segments, and potential points of interest for an area of geographic focus;
a processor configured to rank each map feature in a usefulness index according to each respective map feature's usefulness in directing a user to a destination;
a processor configured to select for display all map features having a usefulness ranking greater than a feature display threshold, wherein the feature display threshold is a number indicating a threshold usefulness ranking, wherein the processor adjusts the feature display threshold based on a density of the map features within the area of geographic focus;
a processor configured to draw a schematic map comprising the route segments, landmarks and points of interest selected for display, the processor drawing the route segments as substantially straight lines that intersect other route segments, the intersecting route segments making up a route for providing directions from a starting point to the destination, the processor further configured to draw the schematic map with distortion to emphasize at least one of the selected map features;
a display configured to display the schematic map; and
a user interface configured to accept user inputs instructing one or more of the processors to generate or modify the schematic map.

13. The system of claim 12, wherein the processors are distributed among one or more devices in the system.

14. The system of claim 13, wherein the processors exist in one or more servers and a handheld device.

15. The system of claim 12, wherein the processors are all embodied in a single processor in a handheld device.

16. The system of claim 12, wherein having a usefulness ranking greater than a feature display threshold comprises having a rank score greater than a feature display threshold rank score.

17. The system of claim 12, wherein the map features can be re-ranked.

18. The system of claim 12, wherein the schematic map does not conform to a particular scale.

19. The system of claim 12, wherein the potential points of interest include search results, businesses, and friends of a user.

20. The system of claim 12, wherein the feature display threshold is adjusted upward for a higher density of the map features within the area of geographic focus and wherein the feature display threshold is adjusted downward for lower density of the map features within the area of geographic focus.

21. The system of claim 12, wherein the processor configured to rank each map feature is configured to determine the usefulness ranking for at least one of landmarks and potential points of interest.

22. A method comprising:
receiving user input instructing one or more of processors to generate or modify a schematic map;
analyzing, by a processor, map vector data, wherein the map vector data comprises data that describes map features for an area of geographic focus;
ranking, by a processor, each map feature in a usefulness index according to each respective map feature's usefulness in directing a user to a destination;
selecting for display, with a processor, all map features having a usefulness ranking greater than a feature display threshold, wherein the feature display threshold is a number indicating a threshold usefulness ranking, wherein the processor adjusts the feature display threshold based on a density of the map features within the area of geographic focus;
drawing, with a processor, a schematic map comprising a plurality of route segments, landmarks and points of interest selected for display, wherein the processor draws the route segments as substantially straight lines that intersect other route segments, and wherein the intersecting route segments make up a route for providing directions from a starting point to the destination;
distorting, with a processor, the schematic map to emphasize at least one of the selected map features;
causing, by a processor, the schematic map to be displayed on a display of a handheld device.

23. The method of claim 22, wherein the feature display threshold is adjusted upward for a higher density of the map features within the area of geographic focus and wherein the feature display threshold is adjusted downward for lower density of the map features within the area of geographic focus.

24. The method of claim 22, wherein the processor is configured to determine the usefulness ranking for at least one of landmarks and potential points of interest.

* * * * *